US 6,545,800 B1

(12) United States Patent
Wilson et al.

(10) Patent No.: US 6,545,800 B1
(45) Date of Patent: Apr. 8, 2003

(54) DEPOLARIZERS FOR OPTICAL CHANNEL MONITORS

(75) Inventors: Gordon C. Wilson, New York, NY (US); Maxim A. Bolshtyansky, Bound Brook, NJ (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/922,004

(22) Filed: Aug. 6, 2001

Related U.S. Application Data
(60) Provisional application No. 60/295,597, filed on Jun. 5, 2001.

(51) Int. Cl.[7] .............................................. H04B 10/12
(52) U.S. Cl. ..................................... 359/341.4; 359/337
(58) Field of Search ............................... 359/337, 341.4

(56) References Cited

U.S. PATENT DOCUMENTS

| | | | | |
|---|---|---|---|---|
| 3,897,684 A | * | 8/1975 | Dewan ..................... | 73/861.13 |
| 5,253,104 A | | 10/1993 | Delavaux .................... | 359/341 |
| 5,426,760 A | * | 6/1995 | Moreland ................... | 707/102 |
| 5,841,571 A | * | 11/1998 | Terahara ..................... | 359/156 |
| 5,861,981 A | | 1/1999 | Jabr ............................ | 359/341 |
| 5,864,581 A | | 1/1999 | Alger-Meunier et al. ... | 375/224 |
| 5,933,552 A | | 8/1999 | Fukushima et al. .......... | 385/24 |
| 5,969,834 A | | 10/1999 | Farber et al. ................ | 359/110 |
| 6,016,213 A | | 1/2000 | Farber et al. ................ | 359/177 |
| 6,061,171 A | | 5/2000 | Taylor et al. ............... | 359/341 |
| 6,115,174 A | | 9/2000 | Grubb et al. ................ | 359/334 |
| 6,134,034 A | * | 10/2000 | Terahara ..................... | 359/124 |
| 6,151,157 A | | 11/2000 | Ball et al. .................... | 359/341 |
| 6,160,659 A | | 12/2000 | Kinoshita ................... | 359/337 |
| 6,198,570 B1 | | 3/2001 | Fukushima et al. ......... | 359/337 |
| 6,205,262 B1 | * | 3/2001 | Shen ............................ | 385/11 |
| 6,215,581 B1 | | 4/2001 | Yadlowsky ................. | 359/337 |
| 6,359,726 B1 | * | 3/2002 | Onaka et al. ............. | 359/337.1 |
| 6,363,180 B1 | * | 3/2002 | Yamate et al. ............. | 356/35.5 |

FOREIGN PATENT DOCUMENTS

| | | |
|---|---|---|
| EP | 762 667 A2 | 3/1997 |
| JP | 11-275027 A2 | 8/1999 |
| WO | WO 97/28584 | 8/1997 |
| WO | WO 99/19693 * | 4/1999 |
| WO | WO 99/66607 | 12/1999 |
| WO | WO 99/67609 | 12/1999 |
| WO | WO 00/4613 A1 | 1/2000 |
| WO | WO 00/14909 | 3/2000 |
| WO | WO 00/49721 | 8/2000 |

OTHER PUBLICATIONS

Weik, Martin H. Fiber Optics Standard Dictionary. 1997, Nternational Thomson Publishing, Third Edition, p. 211.*

Zhang et al. Dependence of Raman Polarization Dependent Gain on Pump Degree of Polarization at High Gain Levels. Optica Amplifiers and There Applications. Jul. 1–4, 2001.*

Azzam et al. IEEE Trans. on Instr. and Meas. vol. 43, No. 6, Dec. 1994.*

Zhu et al. "1.28 Tbit/s (32×40 Gbit/s) Transmission over 1000 km NDSF Employing Distributed Raman Amplification and Active Gain Flattening" Electronics Letters, vol. 37, No. 1, p. 43–45 (Jan. 4, 2001).

Ono et al. "Automatic Gain Control in Silica–Based EDFA with over 50nm Flat Gain Bandwidth using an all Optical Feedback Loop" 10th Optical Amplifiers and their Applications Technical Digest, Jun. 9–11, 1999, pp. 80–83.

Takeda et al. "Active Gain Tilt Equalization by Preferentially 1.43μm– or 1.48μm– Pumped Raman Amplification" OSA Optical Amplifiers and their Applications, vol. 30, p. 101–105 (1999).

* cited by examiner

*Primary Examiner*—Thomas G. Black
*Assistant Examiner*—Stephen Cunningham
(74) *Attorney, Agent, or Firm*—Fish & Neave; G. Victor Treyz

(57) ABSTRACT

Optical channel monitor depolarizers are provided. The depolarizers may be used to reduce the effects of polarization-dependent loss on optical channel power measurements made in optical amplifiers or other optical network equipment. The channel power measurements may be used in controlling optical amplifiers and other equipment in wavelength-division-multiplexing communications links.

20 Claims, 7 Drawing Sheets

US 6,545,800 B1

DEPOLARIZERS FOR OPTICAL CHANNEL MONITORS

This application claims the benefit of provisional patent application No. 60/295,597, filed Jun. 5, 2001.

BACKGROUND OF THE INVENTION

The present invention relates to fiber-optic communications network equipment, and more particularly, to depolarizers for optical channel monitors in optical network equipment such as optical amplifiers.

Fiber-optic networks are used to support-voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been subject to attenuation over fiber-optic paths. A typical amplifier may include erbium-doped fiber coils that are pumped with diode lasers. Raman amplifiers have also been investigated. Discrete Raman amplifiers may use coils of dispersion-compensating fiber to provide Raman gain. Distributed Raman amplifiers.provide gain in the transmission fiber spans that are used to carry optical data signals between network nodes.

It is an object of the present invention to provide optical network equipment such as optical amplifiers that have optical channel monitors.

It is also an object of the present invention to provide depolarizers for optical channel-monitors and other devices in optical network equipment.

SUMMARY OF THE INVENTION

These and other objects of the invention are accomplished in accordance with the present invention by providing optical amplifiers and other optical network equipment for use in fiber-optic communications links in fiber-optic networks. The fiber-optic links may be used to carry optical data signals associated with wavelength-division-multiplexing channels.

The equipment may include an optical tap for tapping optical signals in the equipment. The equipment may also include an optical channel monitor to which the tapped optical signals are provided. The optical channel monitor may measure the channel powers of the tapped optical signals. The measured channel power information may be used in controlling the equipment. For example, the measured channel powers or spectra may be used in controlling a dynamic filter in an optical amplifier to produce a desired gain spectrum or output power spectrum.

A depolarizer may be used to depolarize the tapped optical signals before the tapped optical signals are provided to the optical channel monitor. The depolarizer may be based on one or more lengths of birefringent fiber or a dynamic depolarizer. The use of the depolarizer may reduce errors in the measured channel powers by suppressing the effects of polarization dependent loss.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
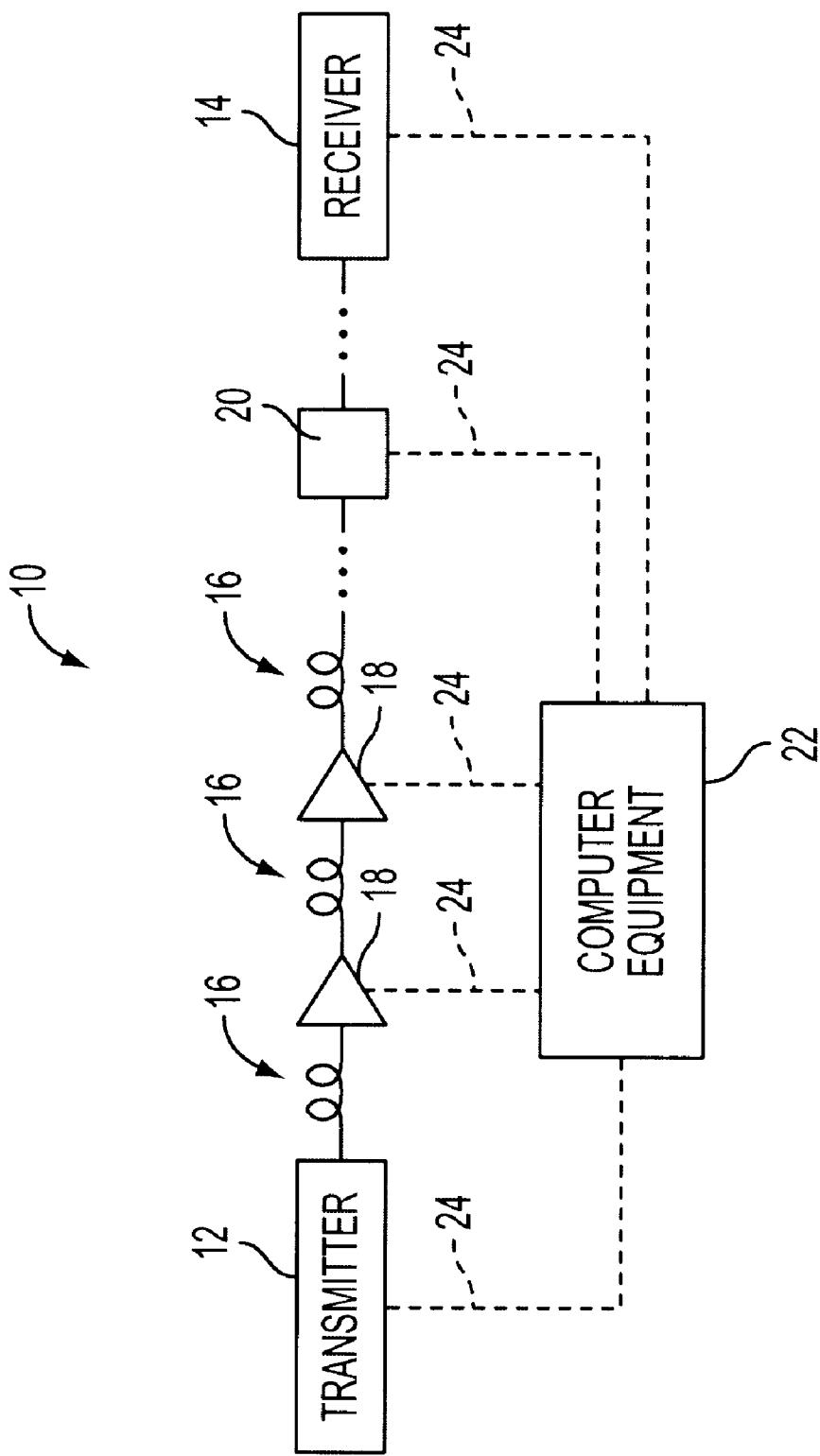
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network. Link 10 may be a point-to-point link, part of a fiber ring network, or part of any other suitable network or system.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided (e.g., one channel), more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Link 10 may include optical network equipment such as transmitter 12, receiver 14, and amplifiers 18 and other optical network equipment 20 such as dispersion compensation modules, dynamic filter modules, add/drop multiplexers, optical channel monitor modules, Raman pump modules, optical switches, performance monitors, etc. For clarity, aspects of the present invention will be described primarily in the context of optical network equipment 20 having gain stages such as optical amplifiers 18. This is, however, merely illustrative. The features of the present invention may be used with any suitable optical network equipment if desired.

Computer equipment 22 may be used to implement a network management system. Computer equipment such as computer equipment 22 may include one or more computers or controllers and may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and other optical network equipment.

Computer equipment 22 may be used to gather spectral information from transmitter 12 (e.g., an output power spectrum), receiver 14 (e.g., a received power spectrum), and amplifiers 18 and other equipment 20 (e.g., input and output power spectra and gain spectra).

If amplifiers 18 or other equipment in link 10 have spectral adjustment capabilities, computer equipment 22 may use the gathered spectral information to determine how the spectra of amplifiers 18 and the other equipment in link 10 are to be controlled. Computer equipment 22 may issue commands to amplifiers 18, transmitters 12, receivers 14, and other equipment 20 that direct this equipment to make appropriate spectral adjustments. The spectral adjustments may be used to optimize the gain or signal spectrum flatness along link 10, may be used to optimize the end-to-end or node-to-node signal-to-noise ratio across the signal band or spectrum, or may be used to implement any other suitable control or optimization functions for link 10.

Spectral adjustments may be made in the output power of transmitter 12 by adjusting a dynamic filter or variable optical attenuators in transmitter 12 to control the output powers of the channels in transmitter 12. Transmitter spectral adjustments may also be made by adjusting the strengths of the drive currents used to drive transmitter laser sources in transmitter 12. Spectral adjustments may be made in the input power for receiver 14 by adjusting a dynamic filter or variable optical attenuators before the received signals are processed by the detectors in receiver 14.

Spectral adjustments in equipment 20 and amplifiers 18 may be made using dynamic filter arrangements, individual variable optical attenuators, variable optical attenuator arrays, gain stage adjustments, or any other suitable spectral adjustment arrangements.

Figure 2:
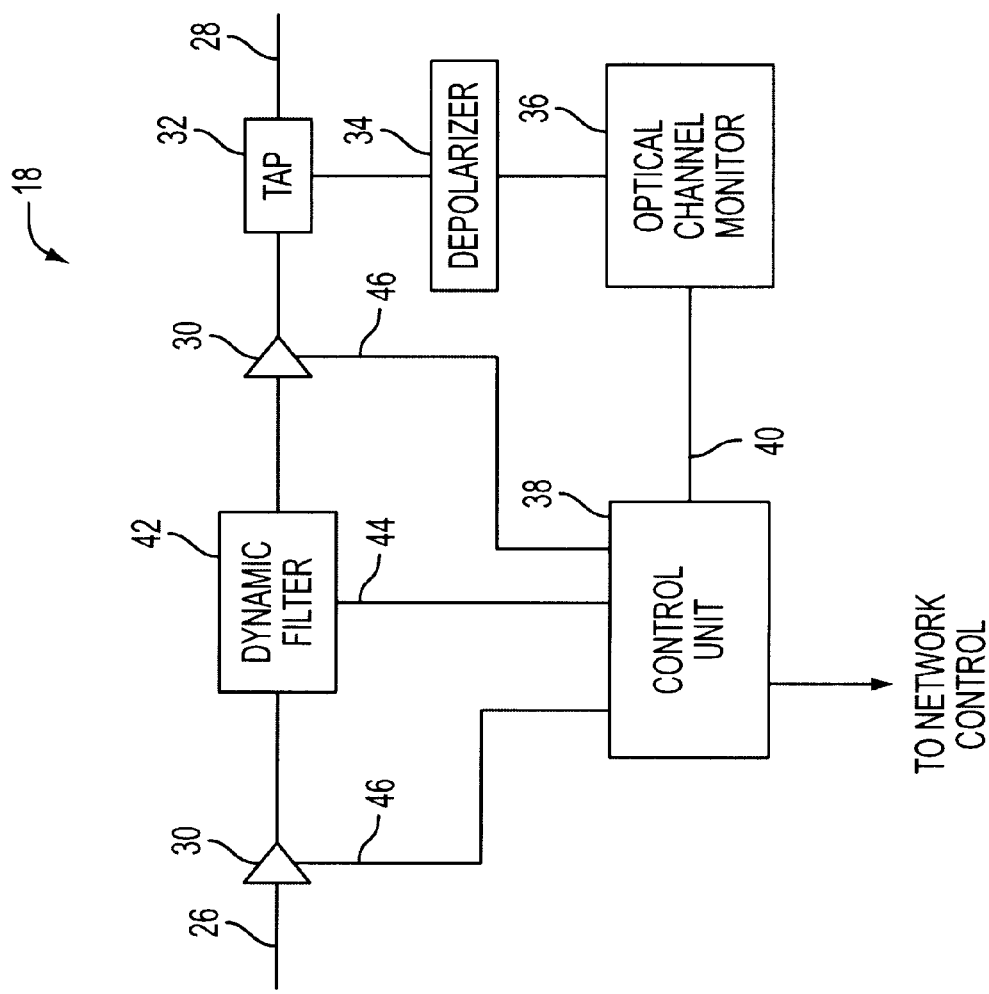
FIG. 2 is a schematic diagram of an illustrative optical amplifier in accordance with the present invention.

An illustrative amplifier 18 is shown in FIG. 2. Optical signals from a span of fiber 16 may be provided to input fiber 26. Corresponding amplified output signals may be provided at output fiber 28. Optical gain may be provided by one or more gain stages such as gain stages 30. Gain stages 30 may include, for example, one or more coils of optically-pumped rare-earth-doped fiber such as erbium-doped fiber. Pumps such as laser diode pumps or other suitable sources of pump light may be used to optically pump the erbium-doped fiber in stages 30.

Tap 32 may be used to tap optical signals traveling along the main fiber path through amplifier 18. Tap 32 may be any suitable optical tap such as a 2%/98% wavelength-insensitive tap.

Tapped light from the fiber at output 28 may be provided to depolarizer 34. Depolarizer 34 may depolarize the tapped optical signals on each wavelength-division multiplexing channel before the signal.s are provided to optical channel monitor 36. Optical channel monitor 36 may make optical channel power measurements on the depolarized tapped signals. In the arrangement of FIG. 2, optical channel monitor 36 may, be used to measure the output channel power spectrum of amplifier 18. The gain spectrum of amplifier 18 may be measured on a channel-by-channel basis by using depolarizer 34 and optical channel monitor 36 to measure tapped input light from input 26. The gain spectrum may be determined by dividing the measured input power spectrum into the measured output power spectrum. If desired, an optical switch may be used to allow a single optical channel monitor such as monitor 36 to measure both input and output power spectra.

Any suitable arrangement may be used for monitor 36. For example, monitor 36 may have a dispersive element (e.g., a prism, grating, thin-film device, arrayed waveguide device, etc.) and an optical detector array (e.g., a charge-coupled device (CCD) array or a photodiode array). If desired, more than one dispersive element may be used. Fabry-Perot etalons or other optical filters having variable optical lengths may also be used to measure the optical spectrum of the tapped-light in amplifier 18. The Fabry-Perot etalons or other filters may be based on microelectromechanical systems (MEMS) devices. These are merely illustrative examples. Any suitable optical monitoring arrangement may be used if desired.

Channel power information that is gathered by optical channel monitor 36 may be provided to control unit 38 over path 40 (e.g., using serial digital communications). Control unit 38 may be based on any suitable control electronics and may include one or more microprocessors, microcontrollers, digital signal processors, field-programmable gate-arrays or other programmable logic devices, application-specific integrated circuits, digital-to-analog converters, analog-to-digital converters, analog control circuits, memory devices, etc.

Control unit 38 may be coupled to dynamic filter 42 using path 44. This allows control unit 38 to control the operation of dynamic filter 42 to adjust the spectrum of amplifier 18. Dynamic filter 42 may be formed using any suitable filter arrangement capable of producing a desired controllable loss (or gain) spectrum. Suitable filters may be based on microelectromechanical systems (MEMS) devices, may be based on fiber-based devices (e.g., fiber Bragg grating devices), may be based on acoustooptic devices (e.g., acoustooptic fiber devices), may be based on thermo-optic arrayed waveguide devices, may be based on liquid crystals, may use electrooptic devices, may be based on semiconductor devices, or may be based on any other suitable dynamic filter arrangement.

Filter 42 may operate in transmission, as shown in FIG. 2, or may operate in reflection (e.g., using a circulator). A transmissive filter 42 may be based on a reflective filter element and a circulator that is used to couple light into and out of filter 42. If desired, filter 42 may use coupling arrangements such as arrangements based on lenses to couple light between the main fiber path in amplifier 18 and filter 42. Dynamic filter 42 may be controlled by control unit 38 over path 44 (e.g., a serial digital path). Pumps such as laser diode pumps or other components in gain stages 30 may be controlled by control unit 38 using paths 46.

If desired, additional components may be provided in amplifier 18, such as additional taps for optical monitoring, filters, wavelength-division-multiplexing couplers, circulators, isolators, attenuators (e.g., variable optical attenuators), active or passive dispersion-compensating elements, optical switches, gain elements, or any other suitable components. These components may be located at any suitable location in the fiber path between input 26 and output 28.

Dynamic filter 42 may also be located in any suitable portion of amplifier 18. For example, filter 42 may be located at output 28, between gain stages 30 as shown in FIG. 2, at input 26, or at any other suitable location within amplifier 18. An advantage of locating dynamic spectral filter 42 between stages 30 as shown in FIG. 2, is that this may minimize noise.

Depolarizer 34 may help to increase the accuracy of optical channel monitor 36 by suppressing errors due to polarization-dependent loss in optical channel monitor 36. The input of optical channel monitor 36 may have a fiber pigtail, a fiber connector, or other suitable input port. In general, optical channel monitor may be characterized by two perpendicular axes—a maximum loss axis and a minimum loss axis—that radiate outward from the longitudinal axis of the optical channel monitor. These axes are sometimes referred to herein as the "polarization dependent loss axes" of the optical channel monitor. The polarization dependent loss characteristics of optical channel monitor 36 may arise from the use of polarization-dependent elements in the optical channel monitor between the input port of the optical channel monitor and the optical detectors in the optical channel monitor that measure the optical signals. As an example, polarization dependent loss in optical channel monitor 36 may arise from the use of dispersive elements such as gratings and prisms, and other polarization-dependent components.

Linearly polarized light that is polarized along the minimum loss axis experiences a minimum attenuation level in optical channel monitor 26, whereas linearly polarized light that is polarized along the maximum loss axis experiences a maximum attenuation level in optical channel monitor 26. As a result, the spectral measurements made by optical channel monitor 36 are influenced by the state of polarization of the light provided to the optical channel monitor input. The difference between the minimum and maximum loss at the input of monitor 36 may be significant. This may result in significant uncertainty in the measured spectrum, which in turn reduces the accuracy of any spectral adjustments that are made to the gain or output power of amplifier 18.

Depolarizer 34 reduces the degree of polarization of the tapped light in each channel from tap 32 before that light is provided to the input of optical channel monitor 36. Because the light for each channel at the input of optical channel monitor 36 is unpolarized, the effects of polarization dependent loss are suppressed and the accuracy of the channel power measurements made using optical channel monitor 36 may be increased.

Depolarizer 34 may be based on any suitable depolarizer configuration. Depolarizer 34 may or may not be wavelength insensitive and may be passive or active (dynamic). Depolarizer 34 may be based on free-space optics (e.g., free-space optics with fiber pigtails) or may be based on fiber devices. If desired, depolarizer 34 may be based on a polarization-scrambler such as a wedge depolarizer. This type of approach may exhibit low wavelength-sensitivity, so that the amount of depolarization that is produced is relatively insensitive to the spectral width of the light being depolarized. A possible disadvantage of this approach is relatively high insertion loss. If desired, the spectral width of the transmitter laser may be broadened by dithering the laser during data transmission. Depolarizer 34 may also be based on a Lyot depolarizer. A fiber-based depolarizer such as a fiber-based Lyot depolarizer or other suitable depolarizer based on birefringent fiber may be used. Depolarizer 34 may be based on birefringent waveguide devices, birefringent crystals, or any other suitable birefringent elements. These are merely illustrative examples. Depolarizer 34 may be based on any suitable depolarizer arrangement. Moreover, some or all of the components of depolarizer 34 may be incorporated into optical channel monitor 36. For clarity, the present invention is described primarily in the context of depolarizers 34 that are separate from optical channel monitor 36. This is, however, merely illustrative.

Figure 3:
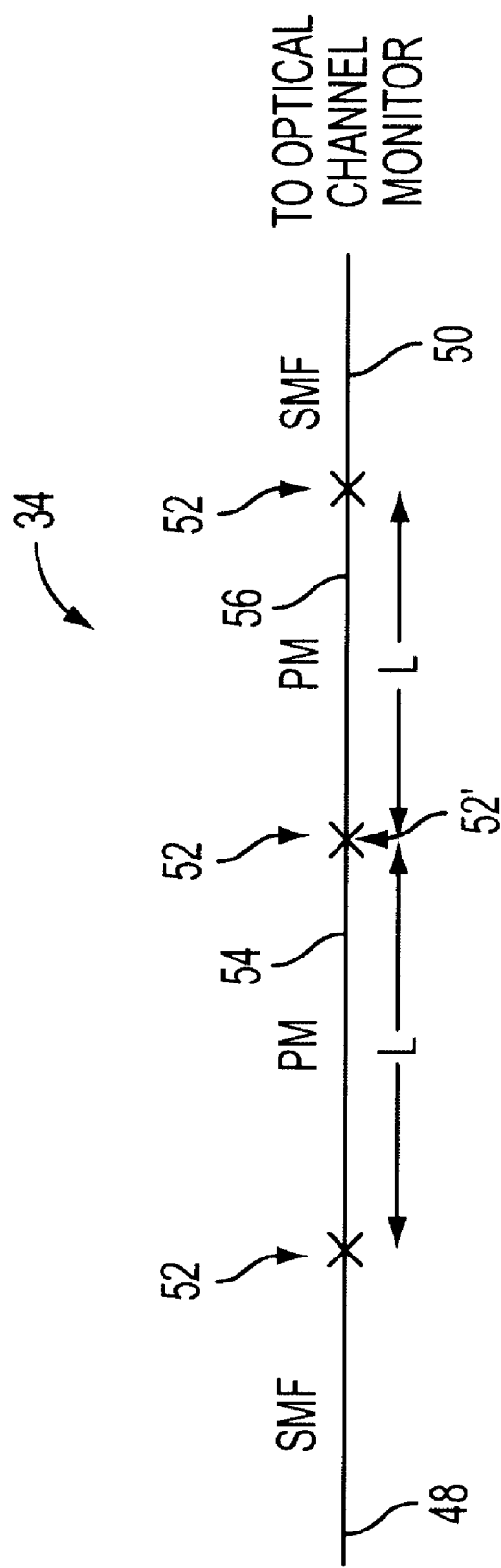
FIG. 3 is a schematic diagram of an illustrative depolarizer that may be used to depolarize optical signals before the optical signals are provided to an optical channel monitor or other component with polarization-dependent loss in accordance with the present invention.

An illustrative fiber-based depolarizer 34 that is based on a Lyot depolarizer arrangement is shown in FIG. 3. Input light from tap 32 may be provided at single mode fiber input 48. The input light in each channel is typically linearly or elliptically polarized. Corresponding output light that has been depolarized by depolarizer 34 may be provided at single mode fiber output 50.

Polarization-maintaining fiber or other suitable birefringent fiber may be connected between input 48 and output 50. The connections indicated by crosses 52 in FIG. 3 may be, for example, fusion splices.

Because single mode fibers 48 and 50 are rotationally symmetric, the rotational or angular orientation of fibers 48 and 50 with respect to the polarization-maintaining fiber is not critical. However, polarization-maintaining fiber lengths 54 and 56 are preferably spliced together such that their principle axes (e.g., their slow and fast axes) are at angles with respect to each other at central splice 52'.

In the example of FIG. 3, depolarizer 34 is based on two lengths of polarization-maintaining fiber of equal lengths L. Other arrangements may also be used if desired. For example, more than two lengths of polarization-maintaining fiber may be used and unequal fiber lengths may be used. In some situations, a single length of polarization-maintaining fiber may be used.

Various data modulation schemes may be used for the channels in wavelength-division-multiplexing link 10. In non-return-to-zero (NRZ) schemes, optical data signals for a given channel may have a spectral width of about 15 GHz when the carrier light for that channel is modulated at data rates of 10 Gbps. In return-to-zero (RTZ) schemes, the optical data signals on each channel may have a spectral width of about 20 GHz when the carrier light is modulated at data rates of 10 Gbps. Light that is modulated at higher data rates will be spectrally broader. In return-to-zero schemes, relatively less power resides in the carrier than with non-return-to-zero schemes.

The polarization-maintaining fibers 54 and 56 may be spliced together so that their principle axes are aligned at 45° angles with respect to each other. The polarization state of the light on the given wavelength-division-multiplexing channel is typically unknown. If the light is linearly polarized with an axis of polarization of that is aligned with one of the principle axes of fiber 54, the light will pass through fiber 54 unaffected. However, fiber 56 will then act as a depolarizer. When the polarization state of the incoming light is not aligned with a principle axis of fiber 54, fiber 54 and fiber 56 will both act to depolarize the light.

Figure 4:
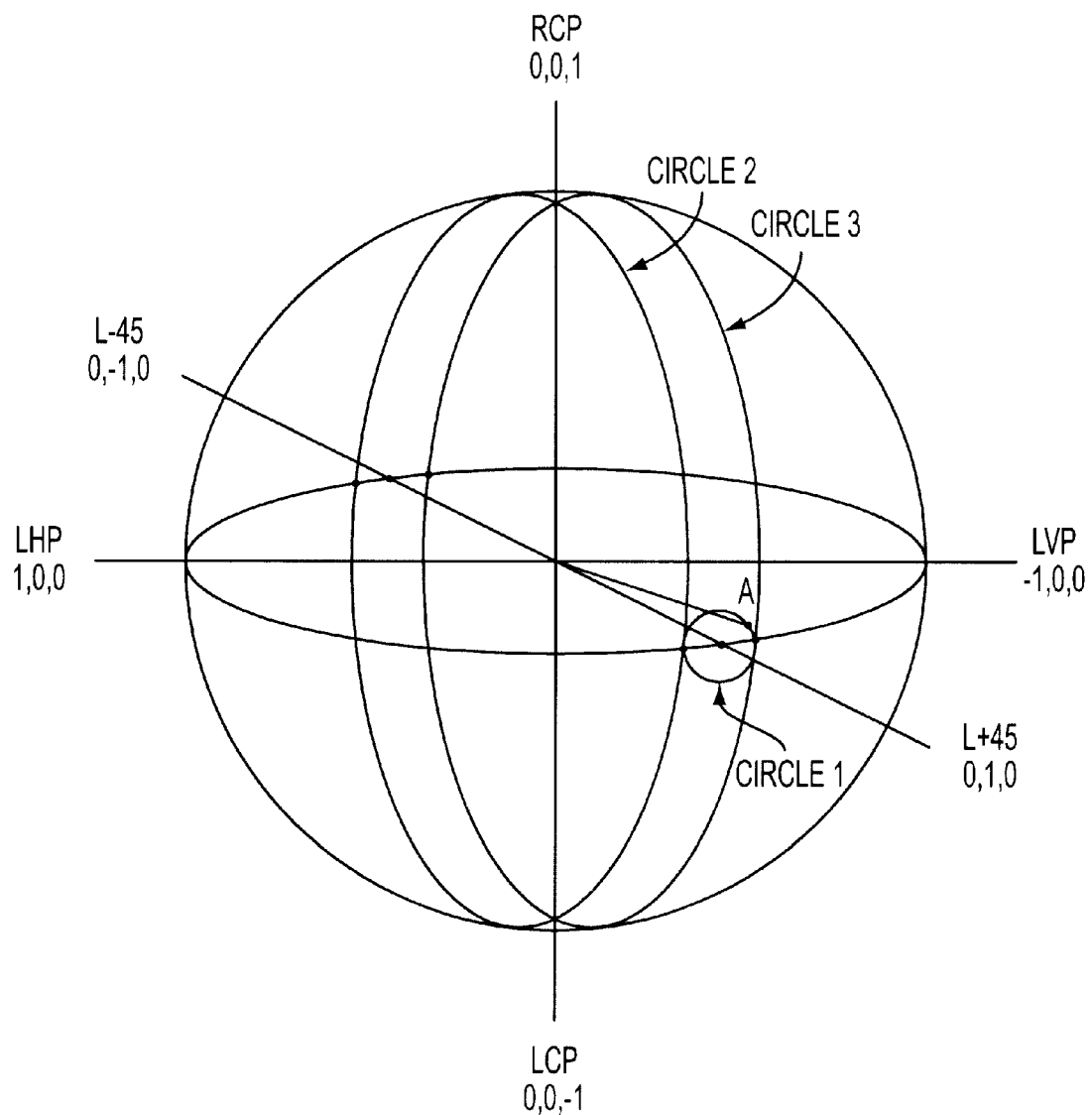
FIG. 4 is a schematic diagram that illustrates the operation of the depolarizer of FIG. 3.

As an example, suppose that the principle axes of fiber 54 are oriented so that they correspond to the 0, −1, 0 and 0, 1, 0 axes on the Poincaré sphere of FIG. 4 and the principle axes of fiber 56 are oriented so that they correspond to the 1, 0, 0 and −1, 0, 0 axes on the Poincaré sphere of FIG. 4. The lengths L of fibers 54 and 56 may be selected to satisfy equation 1.

$$L > c/[\Delta v(n_s - n_f)] \quad (1)$$

In equation 1, c is the speed of light, $\Delta v$ is the spectral width of the given data channel being depolarized (e.g., 15–20 GHz), and $n_s$ and $n_f$ are the respective indices of refraction of the slow and fast axes in the polarization-maintaining fiber. For typical polarization-maintaining fibers, L may be on the order of approximately 20 meters in length.

In the Poincaré sphere representation of FIG. 4, light with a given polarization will precess about the principle axes of the polarization-maintaining fiber as the light travels though the polarization-maintaining fiber. Different wavelengths of light will precess at different rates. If the frequencies of two monochromatic signals differ by $\Delta v$, these signals will have rotated by angles that differ by 360° on the Poincaré sphere after a length L in the fiber.

If the input polarization of the optical data signal light on the given channel is A as shown in FIG. 4, the polarization of the light will smear out on circle 1 as the light passes through fiber 54. In fiber 56, the polarization of the light will smear out in the band bounded by circles 2 and 3, thereby depolarizing the light on the given channel that is provided at output fiber 50.

When depolarizer 34 is used in an amplifier configuration of the type shown in FIG. 2, depolarizer 34 tends to make the combined channel power measurement characteristics of depolarizer 34 and optical channel monitor 36 independent of any polarization-dependent loss in optical channel monitor 36. This will increase the accuracy with which amplifier 18 may measure channel powers. If the measured channel powers are used to control the gain or output spectra of amplifier 18, increasing the accuracy of the measurements made with optical channel monitor 36 will increase the accuracy with which amplifier 18 can produce a given gain or output power spectrum.

With some optical channel monitor configurations, the axes along which minimum and maximum polarization-dependent loss are experienced (the polarization-dependent loss axes) are known. Accordingly, birefringent fiber may be attached at the input of the optical channel monitor such that the principle axes of the fiber are oriented at 45° to the polarization-dependent loss axes.

Figure 5:
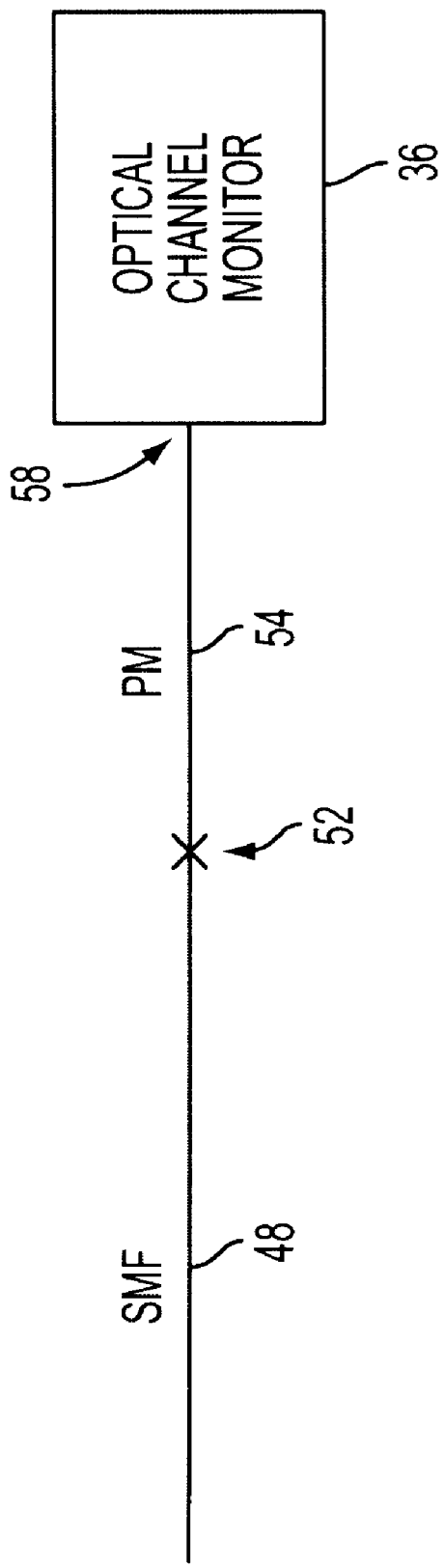
FIG. 5 is a schematic diagram of another illustrative depolarizer that may be used to depolarize optical signals before the optical signals are provided to an optical channel monitor or other component in accordance with the present invention.

A depolarizer 34 based on this arrangement is shown in FIG. 5. Input signal light from tap 32 that is to be depolarized may be provided to single mode fiber input 48. Polarization-maintaining fiber 54 may be connected to optical channel monitor 36 at connection point 58. The length of fiber 54 of FIG. 5 may be selected to satisfy equation 1. The connection of fiber 54 to optical channel monitor 36 may be made so that the principle axes of fiber 54 (the $n_s$ and $n_f$ axes) are aligned at a 45° angle to the polarization-dependent loss axes (PDL MAX and PDL MIN) of optical channel monitor 36, as shown in FIG. 6.

If the light in a given channel at input 48 of FIG. 5 is aligned with one of the principle axes of fiber 54, the light will pass through fiber 54 unaffected. However, that light will be equally divided in power between the maximum and minimum loss axes at connection point 58. As a result, light that is aligned with one of the principle axes of fiber 54 will experience an average amount of polarization-dependent loss in optical channel monitor 36.

Figure 6:
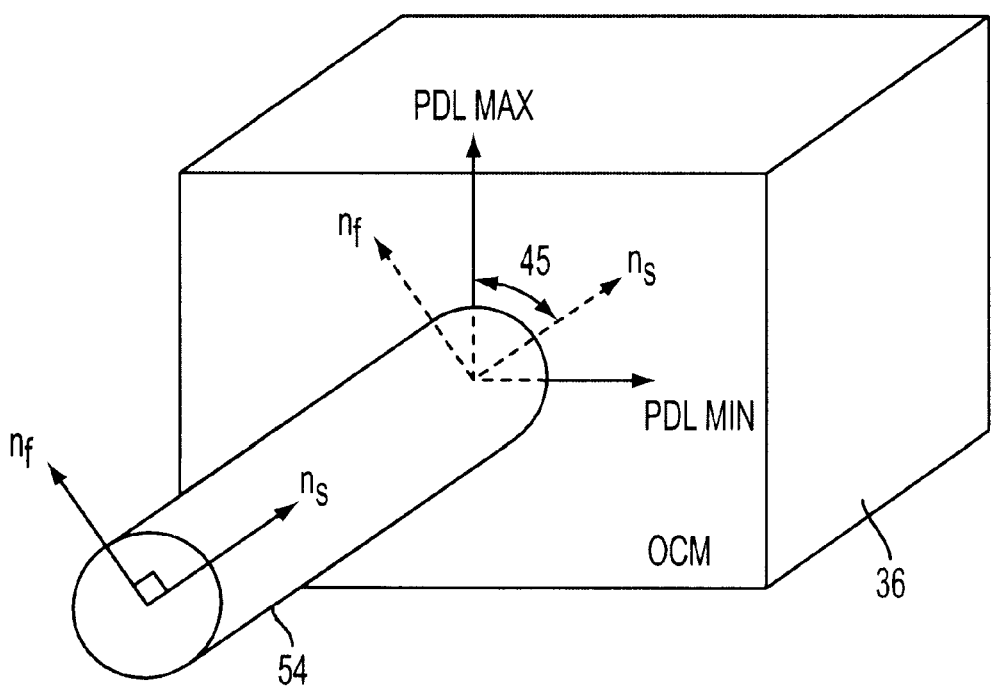
FIG. 6 is a perspective view of the illustrative depolarizer of FIG. 5.

If the light in the given channel at input 48 of FIG. 6 is aligned at a non-zero angle with respect to the principle axes of fiber 54, the polarization states of the light will be smeared out along a circle on the Poincaré sphere as the light travels along fiber 54 due to the spectral width of the optical data signals on the given channel. At the end of fiber 54, the polarization states will be uniformly distributed between the polarization-dependent loss axes of optical channel monitor 36, so that the light will again experience an average amount of polarization-dependent loss in optical channel monitor 36 and spectral measurement inaccuracies due to polarization-dependent loss will be suppressed.

Figure 7:
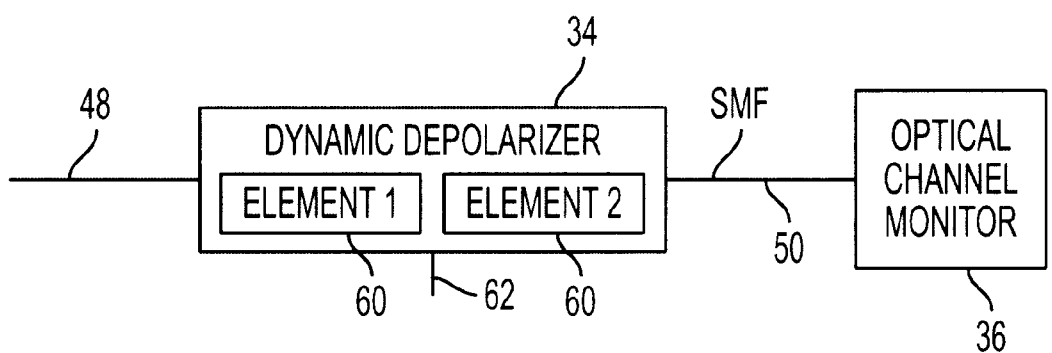
FIG. 7 is a schematic diagram of an illustrative dynamic depolarizer arrangement that may be used to depolarize optical signals before the optical signals are provided to an optical channel monitor or other component in accordance with the present invention.

An illustrative depolarizer arrangement that is based on a dynamic depolarizer 34 is shown in FIG. 7. Tapped light from tap 32 may be provided to fiber input 48, which may be a single mode fiber input. Dynamic depolarizer 34 may have a number of dynamically controllable polarization controller elements 60. Elements 60 may, for example, be based on components with controllable birefringence. The magnitude of the birefringence should generally be more than is required to induce about $\pi$ phase shift (a half wavelength) in the phase of the tapped light signals, although additional birefringence will generally improve the performance of the depolarizer.

Suitable elements 60 include elements based on mechanically squeezed fiber such as fiber squeezed by piezoelectric actuators. Elements 60 may also be based on microelectromechanical systems (MEMS) devices, may be based on acoustooptic devices (e.g., acoustooptic fiber devices), may be based on thermo-optic arrayed waveguide devices, may be based on liquid crystals, may use electrooptic devices, may be based on semiconductor devices, or may be based on any other suitable dynamic polarization controller arrangement. If desired, additional static or dynamic birefringent elements may be used in depolarizer 34 to assist in depolarizing light from input 48.

When depolarizer 34 is based on dynamic depolarizer elements, the depolarizer acts to vary the polarization state of the tapped light as a function of time. The depolarizer 34 may, for example, vary the polarization state of the tapped light over the same space on the Poincaré sphere of FIG. 4 over which the passive depolarizer 34 spreads the polarization state of the tapped light. In a passive depolarizer 34, the state of polarization of the tapped light is spread out over the Poincaré sphere due to the spectral width of the tapped light. When an active depolarizer 34 of the type shown in FIG. 7 is used, the state of polarization of the tapped light is varied over the Poincaré sphere on a time-varying basis.

Because of the polarization-dependant loss of optical channel monitor 34, the instantaneous measured optical power will vary as a function of time as the depolarizer varies the polarization state of the tapped light over the Poincaré sphere. The optical channel monitor 36 and depolarizer 34 may be configured so that this time-dependence is integrated out of the channel power measurements made by optical channel monitor 36. This will generally occur whenever the single-channel integration time of monitor 36 is longer than the time over which the polarization state is varied sufficiently to have an average state that is depolarized.

As shown by path 62, depolarizer 34 may be driven by signals from drivers in control unit 38 or other suitable drive electronics. Depolarizer 34 may operate with or without direct control from control unit 38. If depolarizer 34 is controlled by control unit 38, it may or may not be desired to actively depolarize the tapped signal with depolarizer 34 on a continuous basis.

Figure 8:
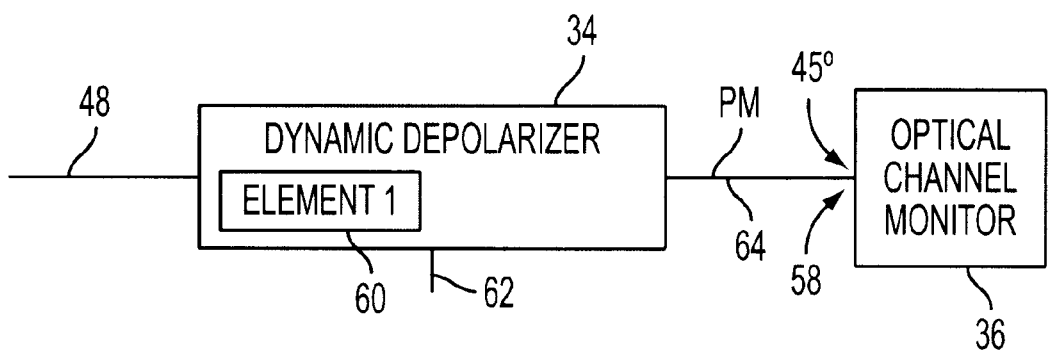
FIG. 8 is a schematic diagram of another illustrative dynamic depolarizer arrangement that may be used to depolarize optical signals before the optical signals are provided to an optical channel monitor or other component in accordance with the present invention.

Another suitable dynamic depolarizer arrangement is shown in FIG. 8. In the arrangement of FIG. 8, a single polarization controlling element 60 is used in dynamic depolarizer 34. Depolarizer 34 may be coupled to optical channel monitor using polarization-maintaining fiber 64. Fiber 64 may be coupled to depolarizer 34 so that the principal axes of element 60 and the principal axes of fiber 64 are aligned. The connection of fiber 64 to optical channel monitor 36 at connection point 58 may be made so that the principle axes of fiber 64 are aligned at a 45° angle to the polarization-dependent loss axes (PDL MAX and PDL MIN) of optical channel monitor 36. With this approach, depolarizer 34 depolarizes the tapped light by varying the polarization state of the tapped light on a time-dependent basis so that on average the polarization of the tapped light is aligned towards the PDL MAX axis of monitor 36 the same amount: that the polarization state of the tapped light is aligned towards the PDL MIN axis of monitor 36. This suppresses channel power measurement inaccuracies due to the polarization-dependent loss of optical channel monitor 36.

An advantage of using dynamic depolarizer schemes is that they suppress the effects of polarization-dependent loss without relying on the spectral width of the tapped light that is being measured. Another possible advantage is that some dynamic depolarizers may occupy less real estate in amplifier 18 than fiber-based solutions. If desired, active and passive depolarizer arrangements may be used in the same depolarizer 34.

Although some of the features of the present invention have been described in the context of optical amplifiers 18, this is merely illustrative. The features of the present invention may be used in any suitable optical network equipment 20 if desired.

It will be understood that the foregoing is merely illustrative of the principles of this invention, and that various modifications can be made by those skilled in the art without departing from the scope and spirit of the invention.

What is claimed is:

1. An optical amplifier that amplifies optical data signals on a wavelength-division-multiplexing fiber-optic communications link having channels at different wavelengths, comprising:
   a gain stage that amplifies the optical data signals, wherein the optical data signals in each channel have an associated channel power;
   a tap for tapping the optical data signals in the optical amplifier;
   an optical channel monitor that measures the channel powers associated with the tapped optical data signals; and
   a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer includes birefringent fiber.

2. An optical amplifier that amplifies optical data signals on a wavelength-division-multiplexing fiber-optic communications link having channels at different wavelengths, comprising:
   a gain stage that amplifies the optical data signals, wherein the optical data signals in each channel have an associated channel power;
   a tap for tapping the optical data signals in the optical amplifier;
   an optical channel monitor that measures the powers associated with the tapped optical data signals; and
   a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer comprises a Lyot depolarizer.

3. An optical amplifier that amplifies optical data signals on a wavelength-division-multiplexing fiber-optic communications link having channels at different wavelengths, comprising:
   a gain stage that amplifies the optical data signals, wherein the optical data signals in each channel have an associated channel power;
   a tap for tapping the optical data signals in the optical amplifier;
   an optical channel monitor that measures the channel powers associated with the tapped optical data signals; and
   a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer comprises a Lyot depolarizer that includes birefringent fiber.

4. An optical amplifier that amplifies optical data signals on a wave length-division-multiplexing fiber-optic communications link having channels at different wavelengths, comprising:
   a gain stage that amplifies the optical data signals, wherein the optical data signals in each channel have an associated channel power;
   a tap for tapping the optical data signals in the optical amplifier;
   an optical channel monitor that measures the channel powers associated with the tapped optical data signals; and
   a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer includes a polarization scrambler.

5. An optical amplifier that amplifies optical data signals on a wavelength-division-multiplexing fiber-optic communications link having channels at different wavelengths, comprising:

a gain stage that amplifies the optical data signals, wherein the optical data signals in each channel have an associated channel power;

a tap for tapping the optical data signals in the optical amplifier;

an optical channel monitor that measures the channel powers associated with the tapped optical data signals; and a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer includes two lengths of birefringent fiber that are spliced together with their principle axes at 45° with respect to each other.

6. An optical amplifier that amplifies optical data signals on a wavelength-division-multiplexing fiber-optic communications link having channels at different wavelengths, comprising:

a gain stage that amplifies the optical data signals, wherein the optical data signals in each channel have an associated channel power;

a tap for tapping the optical data signals in the optical amplifier;

an optical channel monitor that measures the channel powers associated with the tapped optical data signals; and a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer includes two equal lengths of birefringent fiber that are spliced together with their principle axes at 45° with respect to each other.

7. An optical amplifier that amplifies optical data signals on a wavelength-division-multiplexing fiber-optic communications link having channels at different wavelengths, comprising:

a gain stage that amplifies the optical data signals, wherein the optical data signals in each channel have an associated channel power;

a tap for tapping the optical data signals in the optical amplifier;

an optical channel monitor that measures the channel powers associated with the tapped optical data signals; and a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the optical channel monitor has maximum and minimum polarization-dependent loss axes, wherein the depolarizer comprises a length of birefringent fiber connected to the optical channel monitor, and wherein the birefringent fiber has principle axes that are connected to the optical channel monitor at an angle of 45° with respect to the polarization-dependent loss axes.

8. An optical amplifier that amplifies optical data signals on a wavelength-division-multiplexing fiber-optic communications link having channels at different wavelengths, comprising:

a gain stage that amplifies the optical data signals, wherein the optical data signals in each channel have an associated channel power;

a tap for tapping the optical data signals in the optical amplifier;

an optical channel monitor that measures the channel powers associated with the tapped optical data signals; and a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the optical channel monitor has maximum and minimum polarization-dependent loss axes, wherein the depolarizer comprises a single length of birefringent fiber connected to the optical channel monitor, and wherein the birefringent fiber has principle axes that are connected to the optical channel monitor at an angle of 45° with respect to the polarization-dependent loss axes.

9. An optical amplifier that amplifies optical data signals on a wavelength-division-multiplexing fiber-optic communications link having channels at different wavelengths, comprising:

a gain stage that amplifies the optical data signals, wherein the optical data signals in each channel have an associated channel power;

a tap for tapping the optical data signals in the optical amplifier;

an optical channel monitor that measures the channel powers associated with the tapped optical data signals; and a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer comprises at least one dynamic polarization controller element.

10. An optical amplifier that amplifies optical data signals on a wavelength-division-multiplexing fiber-optic communications link having channels at different wavelengths, comprising:

a gain stage that amplifies the optical data signals, wherein the optical data signals in each channel have an associated channel power;

a tap for tapping the optical data signals in the optical amplifier;

an optical channel monitor that measures the channel powers associated with the tapped optical data signals; and a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer comprises two dynamic birefringent elements.

11. An optical amplifier that amplifies optical data signals on a wavelength-division-multiplexing fiber-optic communications link having channels at different wavelengths, comprising:
- a gain stage that amplifies the optical data signals, wherein the optical data signals in each channel have an associated channel power;
- a tap for tapping the optical data signals in the optical amplifier;
- an optical channel monitor that measures the channel powers associated with the tapped optical data signals; and
- a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer comprises at least one dynamic birefringent element, wherein the optical amplifier further comprises a length of polarization-maintaining fiber that couples the depolarizer to the optical channel monitor, wherein the polarization-maintaining fiber has principle axes and the optical channel monitor has polarization-dependent loss axes, and wherein the principle axes and polarization-dependent loss axes are oriented at 45° to each other at the optical channel monitor.

12. Apparatus for use with optical network equipment that handles optical data signals on a wavelength-division-multiplexing fiber-optic communications link having channels at different wavelengths, wherein the optical data signals in each channel have an associated channel power, wherein the optical network equipment has an associated tap for tapping the optical data signals, the apparatus comprising:
- an optical channel monitor that measures the channel powers associated with the tapped optical data signals; and
- a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer includes birefringent fiber.

13. Apparatus for use with optical network equipment that handles optical data signals on a wavelength-division-multiplexing fiber-optic communications link having channels at different wavelengths, wherein the optical data signals in each channel have an associated channel power, wherein the optical network equipment has an associated tap for tapping the optical data signals, the apparatus comprising:
- an optical channel monitor that measures the channel powers associated with the tapped optical data signals; and
- a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer comprises a Lyot depolarizer.

14. Apparatus for use with optical network equipment that handles optical data signals on a wavelength-division-multiplexing fiber-optic communications link having channels at different wavelengths, wherein the optical data signals in each channel have an associated channel power, wherein the optical network equipment has an associated tap for tapping the optical data signals, the apparatus comprising:
- an optical channel monitor that measures the channel powers associated with the tapped optical data signals; and
- a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer comprises a Lyot depolarizer that includes birefringent fiber.

15. Apparatus for use with optical network equipment that handles optical data signals on a wavelength-division-multiplexing fiber-optic communications link having channels at different wavelengths, wherein the optical data signals in each channel have an associated channel power, wherein the optical network equipment has an associated tap for tapping the optical data signals, the apparatus comprising:
- an optical channel monitor that measures the channel powers associated with the tapped optical data signals; and
- a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer includes a depolarization scrambler.

16. Apparatus for use with optical network equipment that handles optical data signals on a wavelength-division-multiplexing fiber-optic communications link having channels at different wavelengths, wherein the optical data signals in each channel have an associated channel power, wherein the optical network equipment has an associated tap for tapping the optical data signals, the apparatus comprising:
- an optical channel monitor that measures the channel powers associated with the tapped optical data signals; and
- a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer includes two lengths of birefringent fiber that are spliced together with their principle axes at 45° with respect to each other.

17. Apparatus for use with optical network equipment that handles optical data signals on a wavelength-division-multiplexing fiber-optic communications link having channels at different wavelengths, wherein the optical data signals in each channel have an associated channel power, wherein the optical network equipment has an associated tap for tapping the optical data signals, the apparatus comprising:

an optical channel monitor that measures the channel powers associated with the tapped optical data signals; and a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer includes two equal lengths of birefringent fiber that are spliced together with their principle axes at 45° with respect to each other.

18. Apparatus for use with optical network equipment that handles optical data signals on a wavelength-division-multiplexing fiber-optic communications link having channels at different wavelengths, wherein the optical data signals in each channel have an associated channel power, wherein the optical network equipment has an associated tap for tapping the optical data signals, the apparatus comprising:

an optical channel monitor that measures the channel powers associated with the tapped optical data signals; and a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the optical channel monitor has maximum and minimum polarization-dependent loss axes, wherein the depolarizer comprises a length of birefringent fiber connected to the optical channel monitor, and wherein the birefringent fiber has principle axes that are connected to the optical channel monitor at an angle of 45° with respect to the polarization-dependent loss axes.

19. Apparatus for use with optical network equipment that handles optical data signals on a wavelength-division-multiplexing fiber-optic communications link having channels at different wavelengths, wherein the optical data signals in each channel have an associated channel power, wherein the optical network equipment has an associated tap for tapping the optical data signals, the apparatus comprising:

an optical channel monitor that measures the channel powers associated with the tapped optical data signals; and a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the optical channel monitor has maximum and minimum polarization-dependent loss axes, wherein the depolarizer comprises a single length of birefringent fiber connected to the optical channel monitor, and wherein the birefringent fiber has principle axes that are connected to the optical channel monitor at an angle of 45° with respect to the polarization-dependent loss axes.

20. Apparatus for use with optical network equipment that handles optical data signals on a wavelength-division-multiplexing fiber-optic communications link having channels at different wavelengths, wherein the optical data signals in each channel have an associated channel power, wherein the optical network equipment has an associated tap for tapping the optical data signals, the apparatus comprising:

an optical channel monitor that measures, the channel powers associated with the tapped optical data signals; and a depolarizer that receives the tapped optical data signals from the tap and that depolarizes the tapped optical data signals in each channel before the channel powers are measured by the optical channel monitor to reduce the effects of polarization-dependent loss on the channel power measurements made by the optical channel monitor, wherein the depolarizer comprises at least one dynamic polarization controller element.

* * * * *